United States Patent
Duan et al.

(10) Patent No.: US 11,234,104 B2
(45) Date of Patent: Jan. 25, 2022

(54) TIME REVERSAL FOR POSITIONING

(71) Applicant: QUALCOMM Incorporated, San Diego, CA (US)

(72) Inventors: Weimin Duan, San Diego, CA (US); Alexandros Manolakos, San Diego, CA (US); Joseph Binamira Soriaga, San Diego, CA (US); Jay Kumar Sundararajan, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/814,829

(22) Filed: Mar. 10, 2020

(65) Prior Publication Data
US 2021/0092558 A1 Mar. 25, 2021

(30) Foreign Application Priority Data
Sep. 25, 2019 (GR) ................ 20190100413

(51) Int. Cl.
*H04W 4/029* (2018.01)
*H04W 72/04* (2009.01)
(Continued)

(52) U.S. Cl.
CPC .......... *H04W 4/029* (2018.02); *H04L 5/0048* (2013.01); *H04L 27/2601* (2013.01); *H04W 72/04* (2013.01)

(58) Field of Classification Search
CPC ..... H04W 4/029; H04W 72/04; H04W 64/00; H04W 4/02; H04W 4/023; H04W 4/025; H04W 4/026; H04W 4/027; H04W 64/006; H04W 72/02; H04W 72/00; H04W 72/0406; H04W 72/0413; H04W 72/0412; H04W 72/12; H04W 72/1205;
(Continued)

(56) References Cited

U.S. PATENT DOCUMENTS 8,457,217 B2 6/2013 Phan Huy et al.
9,825,838 B2 11/2017 Ma et al.
(Continued)

OTHER PUBLICATIONS

Chen C., et al., "Time-Reversal Indoor Positioning with Centimeter Accuracy Using Multi-Antenna WIFI", IEEE Global Conference on Signal and Information Processing (GlobalSIP), Dec. 2016, pp. 1022-1026.
(Continued)

*Primary Examiner* — Meless N Zewdu
(74) *Attorney, Agent, or Firm* — QUALCOMM Incorporated

(57) ABSTRACT

In an aspect, a UE estimates channel state(s) of channels(s) between the UE and network node(s) based on DL RS(s) for positioning that are scheduled and transmitted on DL resources from network node(s). The UE may apply TR filter(s) derived based on the estimated channel state(s) to a UL-RS for positioning. The UE may transmit the TR filtered UL-RS on UL resources which are associated with the DL resources of the DL-RS(s) and which are scheduled by the network node(s). The association between the UL resources and the DL resources may be indicated to the UE by the network node(s).

30 Claims, 13 Drawing Sheets

(51) Int. Cl.
*H04L 27/26* (2006.01)
*H04L 5/00* (2006.01)

(58) Field of Classification Search
CPC ........... H04W 72/085; H04W 72/1278; H04W 40/24; H04W 40/244; H04W 40/246; H04W 56/00; H04W 56/0005; H04W 56/001; H04W 56/0015; H04W 56/002; H04W 88/00; H04W 88/02; H04W 88/08; H04W 88/06; H04W 76/00; H04W 76/10; H04W 76/15; H04W 76/16; H04W 76/27; H04W 76/36; H04W 28/0815; H04W 28/0819; H04W 72/0453; H04W 74/00; H04W 74/002; H04W 74/004; H04W 74/006; H04W 76/11; H04W 88/18; H04W 92/00; H04W 92/02; H04W 72/1226; H04L 5/00; H04L 5/0048; H04L 25/0222; H04L 25/0212; H04L 25/0224; H04L 25/03343; H04L 27/2601; H04L 27/261; H04L 27/26; H04L 25/02; H04L 25/03; H04L 27/2334; H04L 27/2335; H04L 2025/03796; H04L 2025/03802; H04L 29/08657

See application file for complete search history.

(56) References Cited

U.S. PATENT DOCUMENTS

| | | | | |
|---|---|---|---|---|
| 10,327,213 | B1* | 6/2019 | Han et al. | .......... H04W 56/001 |
| 10,805,052 | B2* | 10/2020 | Cases et al. | .......... H04L 5/0048 |
| 2019/0013853 | A1* | 1/2019 | Kela et al. | .......... H04B 7/0617 |
| 2019/0020530 | A1* | 1/2019 | Au et al. | ................ H04L 27/362 |
| 2019/0044677 | A1 | 2/2019 | Ly | |
| 2019/0285722 | A1* | 9/2019 | Markhovsky et al. | ...................... G01S 5/0236 |
| 2020/0351955 | A1* | 11/2020 | Jeon et al. | ........ H04W 74/0841 |

OTHER PUBLICATIONS

International Search Report and Written Opinion—PCT/US2020/047231—ISA/EPO—Feb. 9, 2021.
Fink M., et al., "Acoustic Time-Reversal Mirrors", Topical Review, Inverse Problems, vol. 17, No. 1, Feb. 2001, pp. R1-R38.
Partial International Search Report—PCT/US2020/047231—ISA/EPO—Nov. 30, 2020.

* cited by examiner

TIME REVERSAL FOR POSITIONING

CROSS-REFERENCE TO RELATED APPLICATION

The present application for patent claims priority under 35 U.S.C. § 119 to Greek Patent Application No. 20190100413, entitled "TIME REVERSAL FOR POSITIONING," filed Sep. 25, 2019, assigned to the assignee hereof, and expressly incorporated herein by reference in its entirety.

TECHNICAL FIELD

Various aspects described herein generally relate to wireless communication systems, and more particularly, to applying a time-reversal filter for positioning.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

One or more aspects may be directed to a user equipment (UE). The UE may comprise a transceiver, a memory, and a processor communicatively coupled to the transceiver and the memory. The processor, the transceiver, and/or the memory may be configured to estimate one or more channel states of one or more channels between the UE and one or more network nodes based on one or more downlink reference signals (DL RSs) for positioning transmitted on DL resources from the one or more network nodes. The processor, the transceiver, and/or the memory may also be configured to apply one or more time-reversal (TR) filters to an uplink reference signal (UL RS) for positioning. The one or more TR filters may be derived based on the one or more estimated channel states. The processor, the transceiver, and/or the memory may further be configured to transmit, to the one or more network nodes, the TR filtered UL RS on UL resources. The UL resources of the UL RS may be associated with the DL resources of the one or more DL RSs.

One or more aspects may be directed to a method of a user equipment (UE). The method may comprise estimating one or more channel states of one or more channels between the UE and one or more network nodes based on one or more downlink reference signals (DL RS) for positioning transmitted on DL resources from the one or more network nodes. The method may also comprise applying one or more time-reversal (TR) filters to an uplink reference signal (UL RS) for positioning. The one or more TR filters may be derived based on the one or more estimated channel states. The method may further comprise transmitting, to the one or more network nodes, the TR filtered UL RS on UL resources. The UL resources of the UL RS may be associated with the DL resources of the one or more DL RSs.

One or more aspects may also be directed to a user equipment (UE). The UE may comprise means for estimating one or more channel states of one or more channels between the UE and one or more network nodes based on one or more downlink reference signals (DL RSs) for positioning transmitted on DL resources from the one or more network nodes. The UE may also comprise means for applying one or more time-reversal (TR) filters to an uplink reference signal (UL RS) for positioning. The one or more TR filters may be derived based on the one or more estimated channel states. The UE may further comprise means for transmitting, to the one or more network nodes, the TR filtered UL RS on UL resources. The UL resources of the UL RS may be associated with the DL resources of the one or more DL RSs.

One or more aspects may also be directed a non-transitory computer-readable medium storing computer-executable instructions for a user equipment (UE). The computer-executable instructions may comprise one or more instructions causing the network entity to estimate one or more channel states of one or more channels between the UE and one or more network nodes based on one or more downlink reference signals (DL RS) for positioning transmitted on DL resources from the one or more network nodes. The computer-executable instructions may comprise also one or more instructions causing the network entity to apply one or more time-reversal (TR) filters to an uplink reference signal (UL RS) for positioning. The one or more TR filters may be derived based on the one or more estimated channel states. The computer-executable instructions may comprise further one or more instructions causing the network entity to transmit, to the one or more network nodes, the TR filtered UL RS on UL resources. The UL resources of the UL RS may be associated with the DL resources of the one or more DL RSs.

One or more aspects may also be directed to a network entity. The network entity may comprise a transceiver, a memory, and a processor communicatively coupled to the transceiver and the memory. The processor, the transceiver, and/or the memory may be configured to schedule downlink (DL) resources of one or more downlink reference signals (DL RSs) for positioning for transmission by one or more network nodes. The processor, the transceiver, and/or the memory may also be configured to schedule uplink (UL) resources of an uplink reference signal (UL RS) for positioning for transmission by a user equipment (UE). The processor, the transceiver, and/or the memory may further be configured to associate the UL resources of the UL RS with the DL resources of the one or more DL RSs. The processor, the transceiver, and/or the memory may yet further be configured to transmit, to the UE, an indication of the association between the UL resources of the UL RS with the DL resources of the one or more DL RSs.

One or more aspects may be directed to a method of a network entity. The method may comprise scheduling downlink (DL) resources of one or more downlink reference signals (DL RS) for positioning for transmission by one or more network nodes. The method may also comprise scheduling uplink (UL) resources of an uplink reference signal (UL RS) for positioning for transmission by a user equipment (UE). The method may further comprise associating the UL resources of the UL RS with the DL resources of the one or more DL RSs. The method may yet further comprise transmitting, to the UE, an indication of the association between the UL resources of the UL RS with the DL resources of the one or more DL RSs.

One or more aspects may also be directed to a network entity. The network entity may comprise means for scheduling downlink (DL) resources of one or more downlink reference signals (DL RSs) for positioning for transmission by one or more network nodes. The network entity may also comprise means for scheduling uplink (UL) resources of an uplink reference signal (UL RS) for positioning for transmission by a user equipment (UE). The network entity may further comprise means for associating the UL resources of the UL RS with the DL resources of the one or more DL RSs. The network entity may yet further comprise means for transmitting, to the UE, an indication of the association between the UL resources of the UL RS with the DL resources of the one or more DL RSs.

One or more aspects may also be directed a non-transitory computer-readable medium storing computer-executable instructions for a network entity. The computer-executable instructions may comprise one or more instructions causing the network entity to schedule downlink (DL) resources of one or more downlink reference signals (DL RS) for positioning for transmission by one or more network nodes. The computer-executable instructions may comprise also one or more instructions causing the network entity to schedule uplink (UL) resources of an uplink reference signal (UL RS) for positioning for transmission by a user equipment (UE). The computer-executable instructions may comprise further one or more instructions causing the network entity to associate the UL resources of the UL RS with the DL resources of the one or more DL RSs. The computer-executable instructions may comprise yet further one or more instructions causing the network entity to transmit, to the UE, an indication of the association between the UL resources of the UL RS with the DL resources of the one or more DL RSs.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
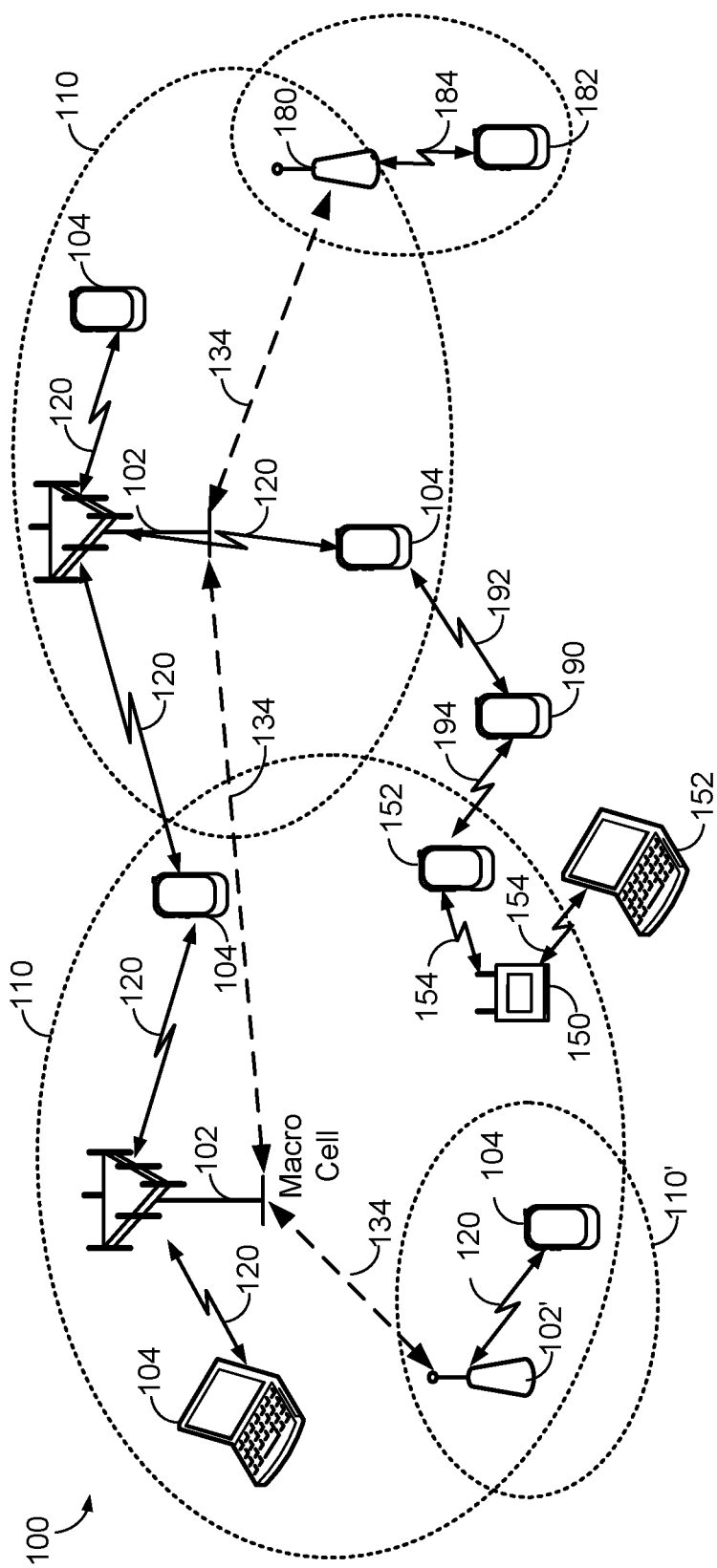
FIG. 1 illustrates an exemplary wireless communications system, according to various aspects.

Various aspects described herein generally relate to wireless communication systems, and more particularly, to enhance detectability of first path signal, e.g., for positioning, by applying a time-reversal filter to transmit positioning signals. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, smart watches and other wearable devices, servers, routers, electronic devices implemented in vehicles (e.g., automobiles, bicycles, motorcycles, etc.) and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100, which may also be referred to as a wireless wide area network (WWAN), may include various base stations 102 and various UEs 104. The base stations 102 may include macro cells (high power cellular base stations) and/or small cells (low power cellular base stations). The macro cells may include Evolved NodeBs (eNBs), where the wireless communications system 100 corresponds to an LTE network, gNodeBs (gNBs), where the wireless communications system 100 corresponds to a 5G NR network, and/or a combination thereof, and the small cells may include femtocells, picocells, microcells, etc.

The base stations 102 may collectively form a Radio Access Network (RAN) and interface with an Evolved Packet Core (EPC), Next Generation Core (NGC), or 5G Core (5GC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, delivery of warning messages, and the like. The base stations 102 may communicate with each other directly or indirectly (e.g., through the EPC/NGC/5GC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available. Although FIG. 1 illustrates specific STAs 152, in an aspect, any of UEs 104 may be capable of communicating with WLAN AP 150 and may therefore be referred to as a WLAN station (STA).

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
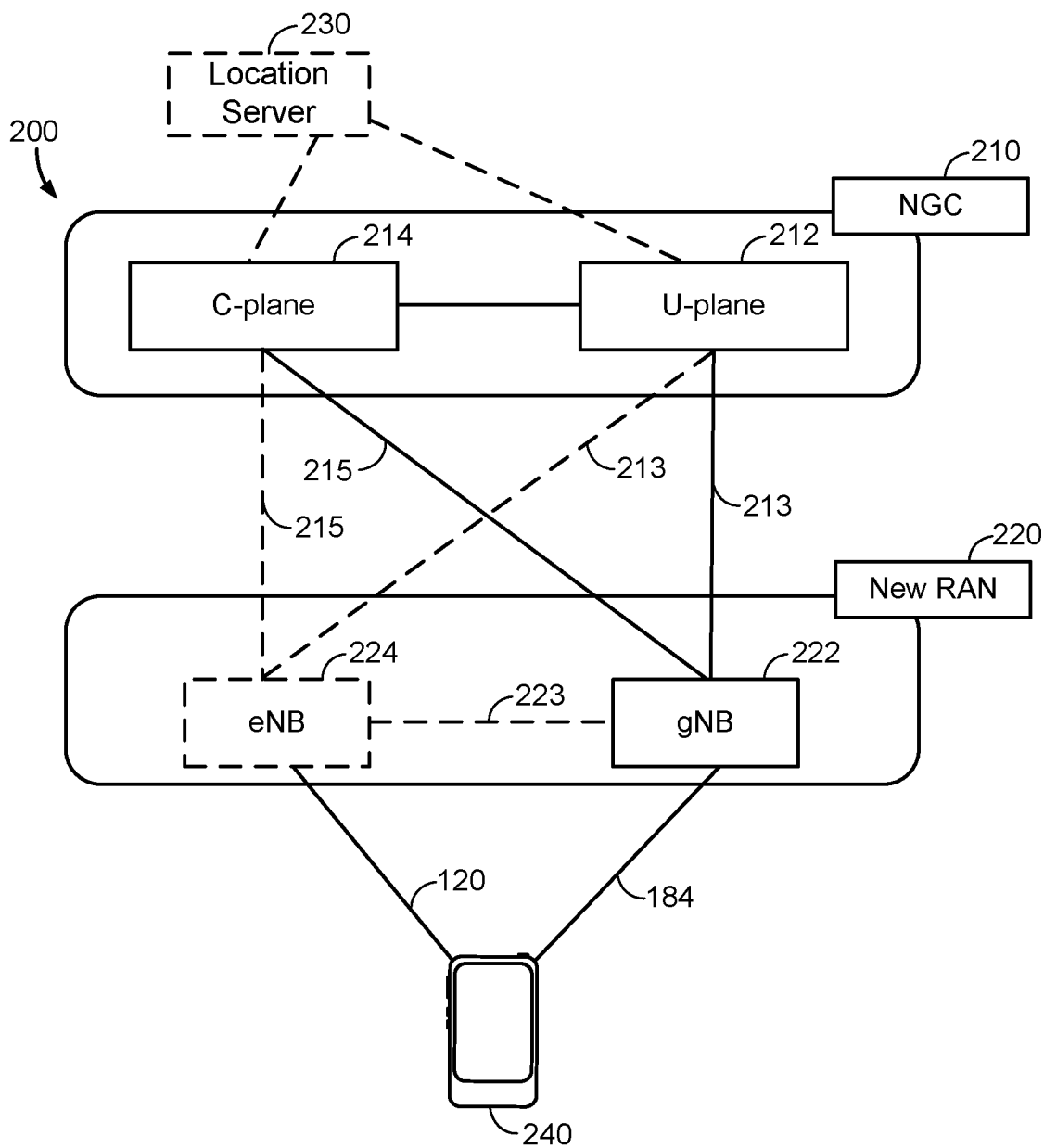
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 may connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
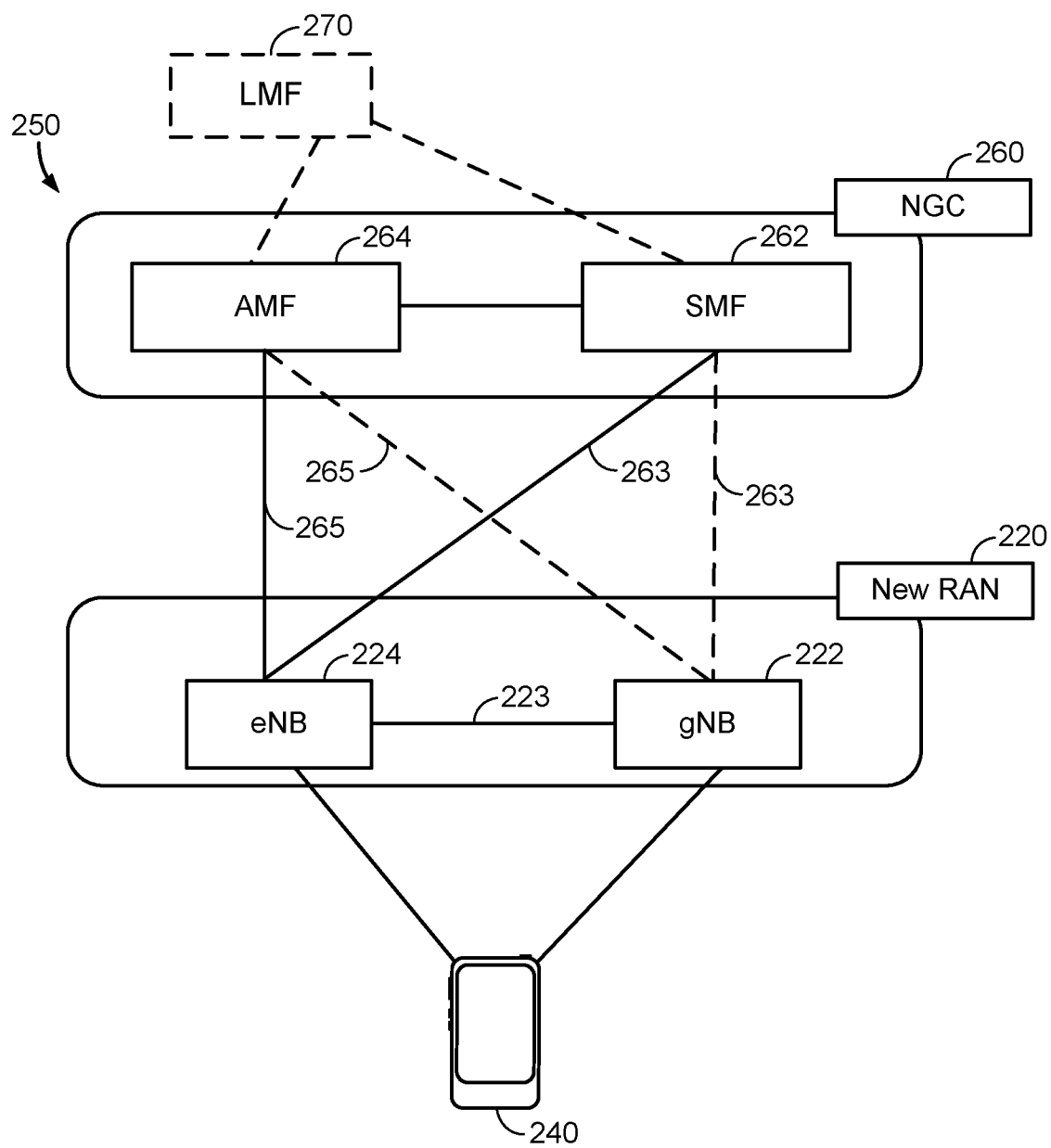

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 may connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
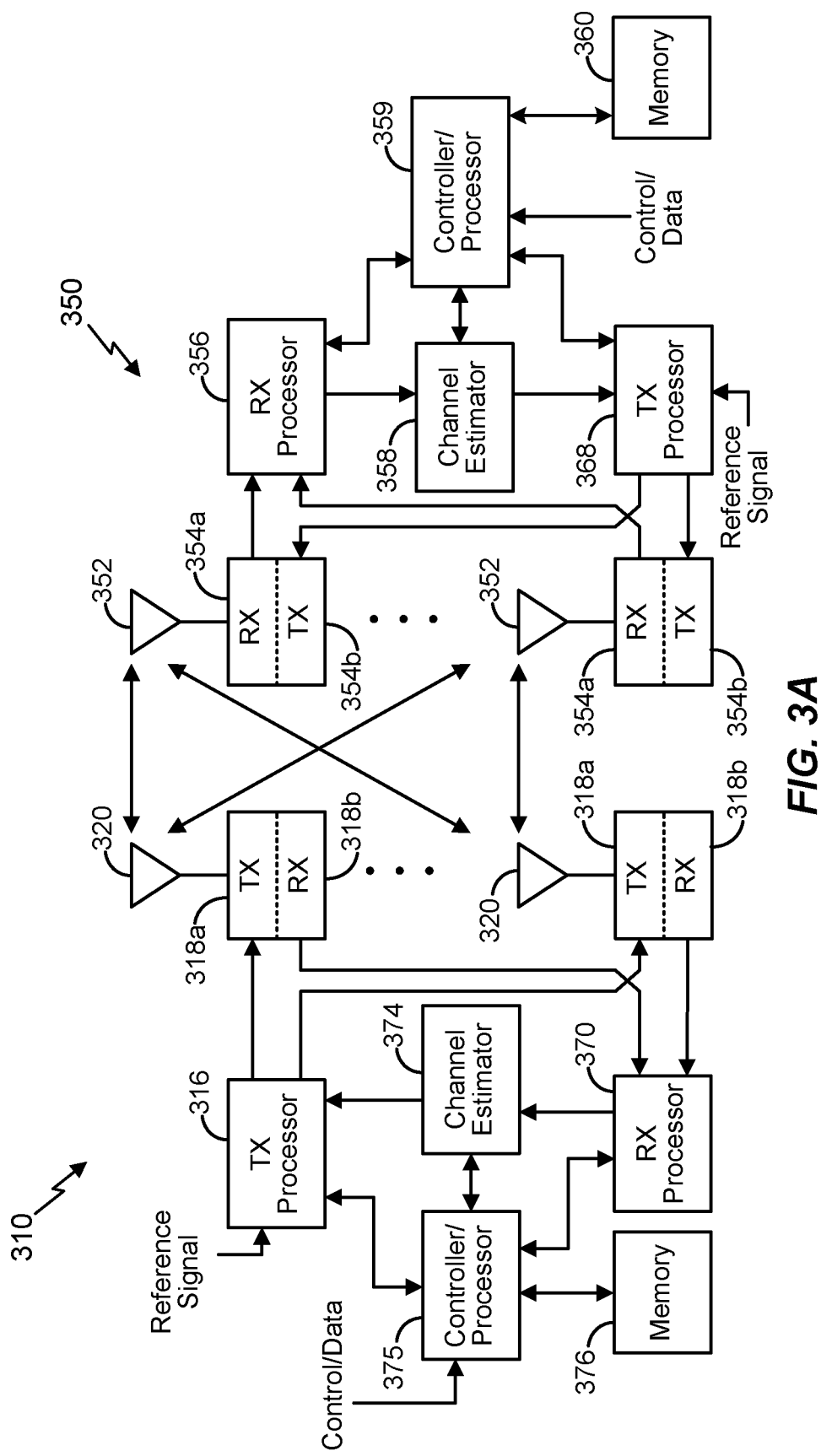
FIG. 3A illustrates an exemplary base station and an exemplary UE in an access network, according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 may implement functionality for a radio resource control (RRC) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a may receive a signal through its respective antenna 352. Each receiver 354a may recover information modulated onto an RF carrier and provides the information to the RX processor 356. The TX processor 368 and the RX processor 356 may implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 may then convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the base station 310. These soft decisions may be based on channel estimates computed by the channel estimator 358. The soft decisions may then be decoded and de-interleaved to recover the data and control signals that were originally transmitted by the base station 310 on the physical channel. The data and control signals may then be provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 may provide demultiplexing between transport and logical channels, packet reassembly, deciphering, header decompression, and control signal processing to recover IP packets from the core network. The controller/processor 359 may also be responsible for error detection.

Similar to the functionality described in connection with the DL transmission by the base station 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354b. Each transmitter 354b may modulate an RF carrier with a respective spatial stream for transmission.

The UL transmission may be processed at the base station 310 in a manner similar to that described in connection with the receiver function at the UE 350. Each receiver 318b may receive a signal through its respective antenna 320. Each receiver 318b may recover information modulated onto an RF carrier and provide the information to a RX processor 370.

The controller/processor 375 can be associated with a memory 376 that stores program codes and data. The memory 376 may be referred to as a computer-readable medium. In the UL, the controller/processor 375 may provide demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Regarding the base station 310, a combination of transmitter 318a and receiver 318b may be referred to as a transceiver 318. The transmitter 318a and the receiver 318b that make up the transceiver 318 may be separate components dedicated for transmitting and receiving. Alternatively, the transmitter 318a and the receiver 318b may be integrated into the transceiver 318. The transceiver 318 may be wireless (e.g., for communication with the UE 350 and/or with other network nodes (e.g., base stations, LMF, etc.)), or wired (e.g., for communication with other network nodes).

Regarding the UE 350, a combination of transmitter 354a and receiver 354b may be referred to as a transceiver 354. The transmitter 354a and the receiver 354b that make up the transceiver 354 may be separate components dedicated for transmitting and receiving. Alternatively, the transmitter 354a and the receiver 354b may be integrated into the transceiver 354. The transceiver 354 may be wireless (e.g., for communication with the base station 310).

Figure 3B:
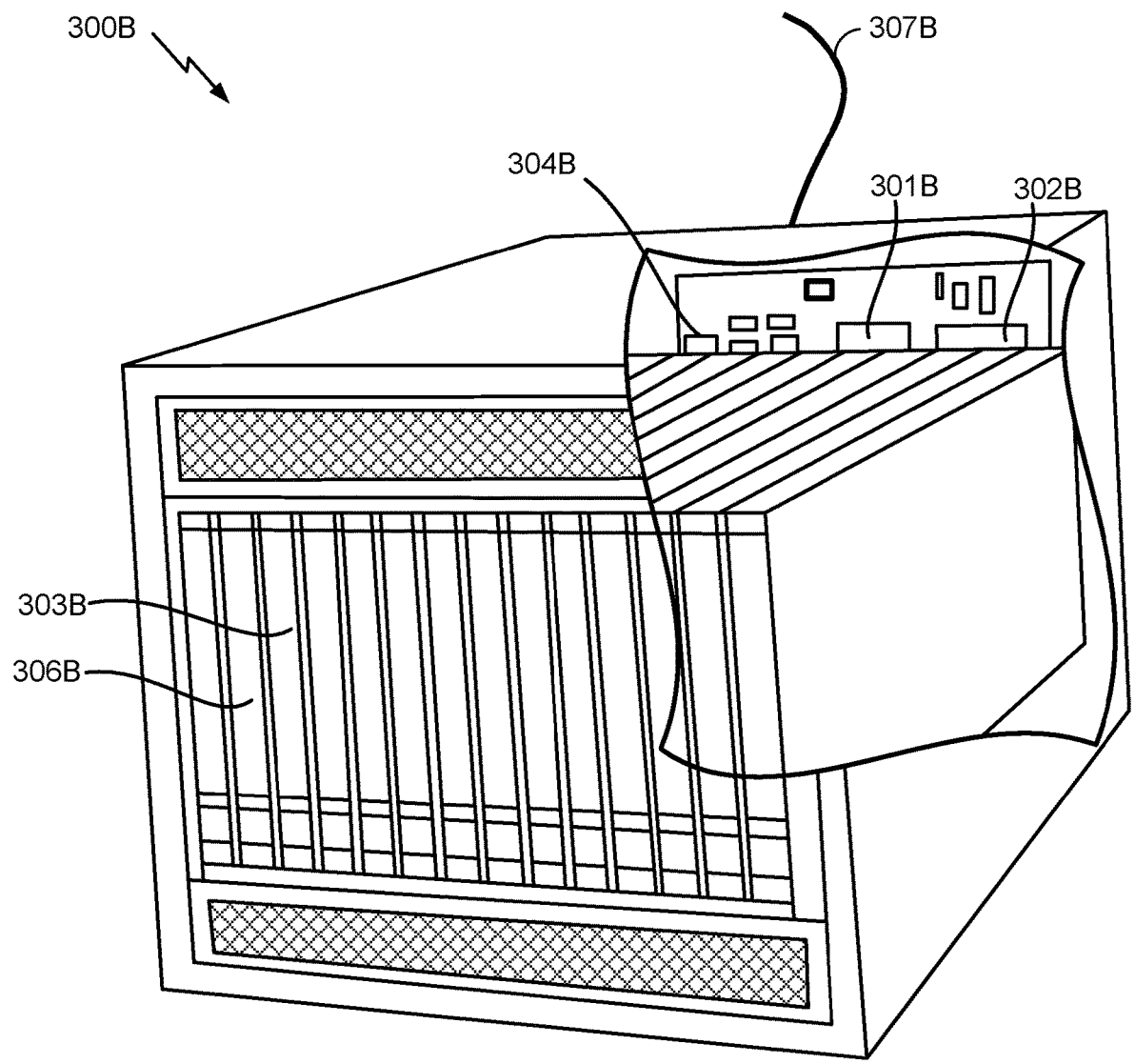
FIG. 3B illustrates an exemplary server, according to various aspects.

FIG. 3B illustrates an exemplary server 300B, according to an aspect. In an example, the server 300B may correspond to an example configuration of the location server 230 or the LMF 270 described above. The server 300B may include a processor 301B communicatively coupled to volatile memory 302B and a large capacity nonvolatile memory, such as a disk drive 303B. The server 300B may also include a floppy disc drive, compact disc (CD) or DVD disc drive 306B communicatively coupled to the processor 301B. It should be noted that unless specifically indicated otherwise, when two components are "communicatively coupled", the two components may be coupled through one or more intermediaries (e.g., bus) and may be wired (e.g., electrical and/or optical) or may be wireless.

The server 300B may also include network access ports 304B communicatively coupled to the processor 301B for establishing data connections with a network 307B, such as a local area network communicatively coupled to other broadcast system computers and servers or to the Internet. To the extent that the network access ports 304B are bi-directional, they may also be referred to as transceivers. While not shown, a transceiver may be wired or wireless, and may comprise a transmitter and a receiver. The transmitter and receiver may be separate components respectively dedicated for transmissions and receptions. Alternatively, the transmitter and the receiver may be integrated into the transceiver.

Figure 4:
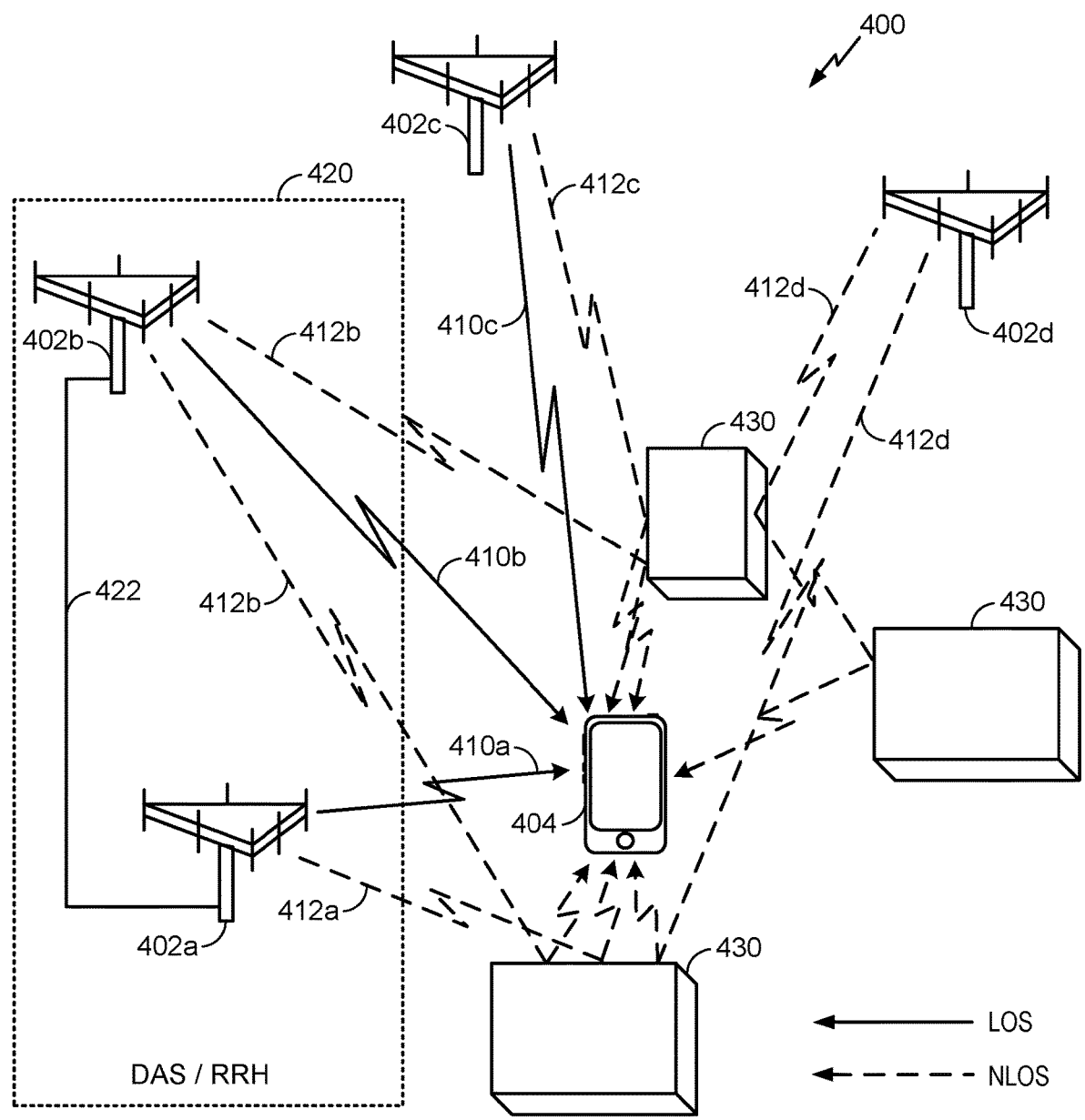
FIG. 4 illustrates an exemplary wireless communications system, according to various aspects.

FIG. 4 illustrates an exemplary wireless communications system 400 according to an aspect. In the example of FIG. 4, a UE 404, which may correspond to any of the UEs described above with respect to FIGS. 1, 2 and 3 (e.g., UEs 104, UE 182, UE 190, 240, 350, etc.), may be attempting to calculate or otherwise estimate its position, or assist another entity (e.g., a base station or core network component, another UE, a location server, a third party application, etc.) to calculate or otherwise estimate its position. The UE 404 may communicate wirelessly with a plurality of base stations 402a-d (collectively, base stations 402), which may correspond to any combination of base stations described above with respect to FIGS. 1, 2 and 3 (e.g., 102, 102', 150, 180, 222, 224, 310, etc.), using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using two-dimensional coordinate system and/or three-dimensional coordinate system. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signal blocks (SSB), Timing Reference Signals (TRS), etc.) to UEs 404 in their coverage area to enable a UE 404 to measure reference RF signal timing differences (e.g., OTDOA, RTT or RSTD) between pairs of network nodes and/or to identify the beam that best excites the LOS or shortest radio path between the UE 404 and the transmitting base stations 402. Identifying the LOS/shortest path beam(s) is of interest not only because these beams can subsequently be used for OTDOA measurements between one or more pairs of base stations 402 (e.g., each OTDOA measurement is between a pair of base stations, and OTDOA measurements between multiple pairs of base stations can be performed in some implementations), but also because identifying these beams can directly provide some positioning information based on the beam direction. Moreover, in some systems, these beams can subsequently be used for other position estimation methods that require precise ToA, such as round-trip time estimation based methods. Alternatively or in addition thereto, the beams may be used for angle-based positioning methods such as methods based on angle of arrival (AoA) and/or angle of departure (AoD). For example, for identification of beam direction via downlink AoD (DL-AOD) between gNB and UE, the UE may perform a beam scan.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230, LMF 270) may send assistance data to the UE 404 that includes an identification of one or more neighbor cells of base stations 402 and configuration information for reference RF signals transmitted by each neighbor cell. Location Management Function (LMF) may be an example of the location server in 5G, and Enhanced Serving Mobile Location Center (e-SMLC) in LTE. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) may measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs, RTTs and/or RSTDs between RF signals received from pairs of network nodes, the UE 404 may measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

In an aspect, one or more of base stations 402 may be configured to use beamforming to transmit RF signals. In that case, some of the available beams may focus the transmitted RF signal along the LOS paths 410 (e.g., the beams produce highest antenna gain along the LOS paths) while other available beams may focus the transmitted RF signal along the NLOS paths 412. A beam that has high gain along a certain path and thus focuses the RF signal along that path may still have some RF signal propagating along other paths; the strength of that RF signal naturally depends on the beam gain along those other paths. An "RF signal" comprises an electromagnetic wave that transports information through the space between the transmitter and the receiver. As used herein, a transmitter may transmit a single "RF signal" or multiple "RF signals" to a receiver. However, as described further below, the receiver may receive multiple "RF signals" corresponding to each transmitted RF signal due to the propagation characteristics of RF signals through multipath channels.

Where a base station 402 uses beamforming to transmit RF signals, the beams of interest for data communication between the base station 402 and the UE 404 will be the beams carrying RF signals that arrive at UE 404 with the highest signal strength (as indicated by, e.g., the Reference Signal Received Power (RSRP) or SINR in the presence of a directional interfering signal), whereas the beams of interest for position estimation will be the beams carrying RF signals that excite the shortest path or LOS path (e.g., an LOS path 410). In some frequency bands and for antenna systems typically used, these will be the same beams. However, in other frequency bands, such as mmW, where typically a large number of antenna elements can be used to create narrow transmit beams, they may not be the same beams. As described below with reference to FIG. 5, in some cases, the signal strength of RF signals on the LOS path 410 may be weaker (e.g., due to obstructions) than the signal strength of RF signals on an NLOS path 412, over which the RF signals arrive later due to propagation delay.

Figure 5:
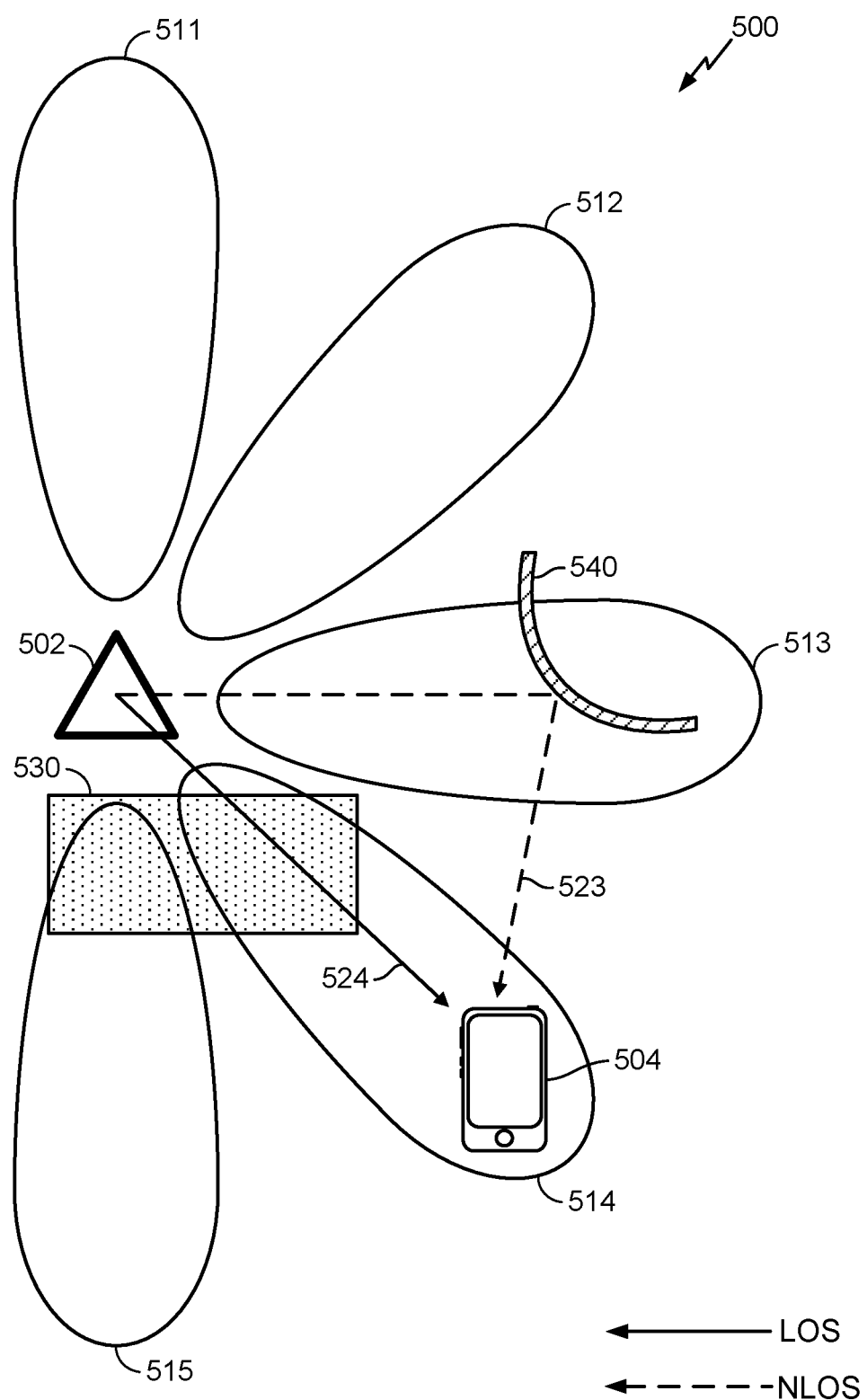
FIG. 5 illustrates an exemplary wireless communications system, according to various aspects.

FIG. 5 illustrates an exemplary wireless communications system 500 according to an aspect. In the example of FIG. 5, a UE 504, which may correspond to UE 404 in FIG. 4, may be attempting to calculate or otherwise estimate its position, or to assist another entity (e.g., a base station or core network component, another UE, a location server, a third party application, etc.) to calculate or otherwise estimate its position. The UE 504 may communicate wirelessly with a base station 502, which can correspond to one of base stations 402 in FIG. 4, using RF signals and standardized protocols for the modulation of the RF signals and the exchange of information packets.

As illustrated in FIG. 5, the base station 502 may be utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 may receive an NLOS data stream 523 of RF signals transmitted on beam 513 and an LOS data stream 524 of RF signals transmitted on beam 514. Although FIG. 5 illustrates the NLOS data stream 523 and the LOS data stream 524 as single lines (dashed and solid, respectively), as will be appreciated, the NLOS data stream 523 and the LOS data stream 524 may each comprise multiple rays (i.e., a "cluster") by the time they reach the UE 504 due, for example, to the propagation characteristics of RF signals through multipath channels. For example, a cluster of RF signals may be formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS data stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS data stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS data stream 524 is weaker than the NLOS data stream 523, the LOS data stream 524 will arrive at the UE 504 before the NLOS data stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS data stream 523. The beam of interest for position estimation, however, would be the beam 514, as it carries the strongest LOS data stream 524, despite being obstructed.

New Radio (NR) DL PRS resource may be defined as a set of resource elements used for NR DL PRS transmission that can span multiple physical resource blocks (PRBs) within N consecutive symbols within a slot, where N is one or more. In any OFDM symbol, a PRS resource may occupy consecutive PRBs. A DL PRS Resource Set may be defined as a set of DL PRS Resources, in which each DL PRS Resource has a DL PRS Resource ID. The DL PRS Resources in a DL PRS Resource set may be associated with a same Tx/Rx point (TRP).

A DL PRS Resource ID in a DL PRS Resource set may be associated with a single beam transmitted from a single TRP. Note that a TRP may transmit one or more beams. This may or may not have any implications on whether the TRPs and beams from which signals are transmitted are known to the UE. A DL PRS occasion may be viewed as one instance of periodically repeated time windows (e.g., consecutive slots) where DL PRS is expected to be transmitted. A DL PRS configuration including DL PRS transmission schedule can be indicated to the UE for DL PRS positioning measurements. Note that the UE may not be expected to perform any blind detection of DL PRS configurations.

Accuracy of radio based positioning can be severely affected by the NLOS multipath propagation, which is unavoidable for some scenarios, such as in urban areas and indoor environments. In distance/range estimation (such as through ToA measurement), the detection of the first or the LOS path is challenging in presence of NLOS multipath propagation channels.

At low SNR (signal-to-noise ratio) and/or at low SINR (signal-to-interference-plus-noise ratio), the first path with low power may not be successfully detected by the receiver. Thus one significant issue may be framed as how to enhance the capability to detect the first path in even in the presence of NLOS multipath channel under low SNR and/or SINR.

In an aspect, it is proposed to use time-reversal (TR) filtering to enhance the first or LOS path detection capabilities. In TR transmission, a reference signal S may be pre-filtered with a time-reversal filter:

$$S_t = S \circledast h(-t)^* \quad (1)$$

In equation (1), the time-reversal filter $h(-t)^*$ is the time-reversed channel impulse response (CIR) between a transmitter (e.g., one of UE and gNB) and a receiver (e.g., other of UE and gNB). The filtered signal $S_t$ may be transmitted.

The signal Y received at the receiver may be written as:

$$Y = S \circledast h(-t)^* \circledast h(t) \quad (2)$$

At the receiver side, the equivalent CIR is $R_{hh} = h(-t)^* \circledast h(t)$, which is the channel autocorrelation.

Since TR filtering can compress the multipath channel, it can increases the SNR and improves the estimation accuracy. This technique to increase the SNR relies upon the knowledge of the channel, in particular, the CIR h(t) of the channel. Thus, in an aspect, TR precoding (TR filtering) of a reference signal (RS) at the transmitter may be based on a channel state information (CSI) between the transmitter and the receiver (e.g., CSI between a UE and a gNB) from which h(t) may be estimated.

The TR-based positioning may be applied in the uplink (UL) and/or in the downlink (DL) direction. Reference signals for TR-based positioning in UL will be generically referred to as uplink reference signals (UL RS). Similarly, reference signals for TR-based positioning in the DL will be generically referred to as uplink reference signals (DL RS). Examples of UL RS may include sounding reference signal (SRS), demodulation reference signal (DMRS), phase tracking reference signal (PTRS), etc. Examples of DL RS may include positioning reference signal (PRS), channel state information reference signal (CSI-RS), DMRS, primary synchronization signal (PSS), secondary synchronization signal (SSS), PTRS, etc. For signals such as DMRS and PTRS that may be transmitted in both UL (e.g., by the UE) and DL (e.g., by the gNB) directions, the signals may be prepended with UL or DL to distinguish. For example UL DMRS may be differentiated from DL DMRS.

For TR-based positioning in the uplink, a UE may transmit a UL RS (e.g., SRS), which can be expected to be received by multiple gNBs. As such, if the UL RS is precoded, the precoding should not be "gNB-specific". In other words, to enable TR positioning measurement in UL, a UL RS may be associated with multiple DL RSs (e.g., multiple PRSs). This is due at least in part to the fact that the TR filter applied to the UL RS is derived from the CIRs the channel between the UE and the multiple gNBs (i.e., CSIs), which themselves are estimated based on the multiple DL RSs transmitted from the multiple gNBs.

Similarly, in the downlink, a gNB may transmit a DL RS (e.g., PRS), which can be expected to be received by multiple UEs. As such, if the DL RS is precoded, the precoding should not be "UE-specific". In other words, to enable TR positioning measurement in DL, a DL RS may be associated with multiple UL RSs since the TR filter applied to the DL RS may be derived from multiple uplink CSI estimates, which themselves may be derived based on multiple UL RSs.

Going forward, applying TR filtering on the uplink will be described as an exemplary technique. That is, associating a UL RS with multiple DL RSs will be described. In particular, techniques will be described in which an SRS is associated with multiple PRSs. While SRS and PRSs will be used, it should be noted that any UL RS and DL RSs will be applicable. Also while TR on the uplink will be described, it should be relatively straight forward to apply the described techniques to TR on the downlink.

Just as an aside, typically, the numbers of UEs significantly outnumber the number of gNBs. As such, the TR transmission in the downlink (e.g., associating a DL RS with multiple UL RSs) would be expected to be inefficient compared to TR transmission in the uplink (e.g., associating a DL RS with multiple UL RSs). But as indicated just above, it is contemplated that the described technique will be applicable for both TR transmission in the uplink as well as in the downlink.

As mentioned, TR transmission in the uplink will be described. A channel, in particular a multipath channel, can be frequency selective. That is, h(t) can be frequency selective. This implies that the TR filter h(−t)* may also be frequency selective, which further implies that the TR precoder for SRS for positioning may be frequency selective. Then whether or not a UE is capable to derive and/or apply the TR filter should be considered. Thus, in an aspect, a UE capability may be indicated.

Figure 6:
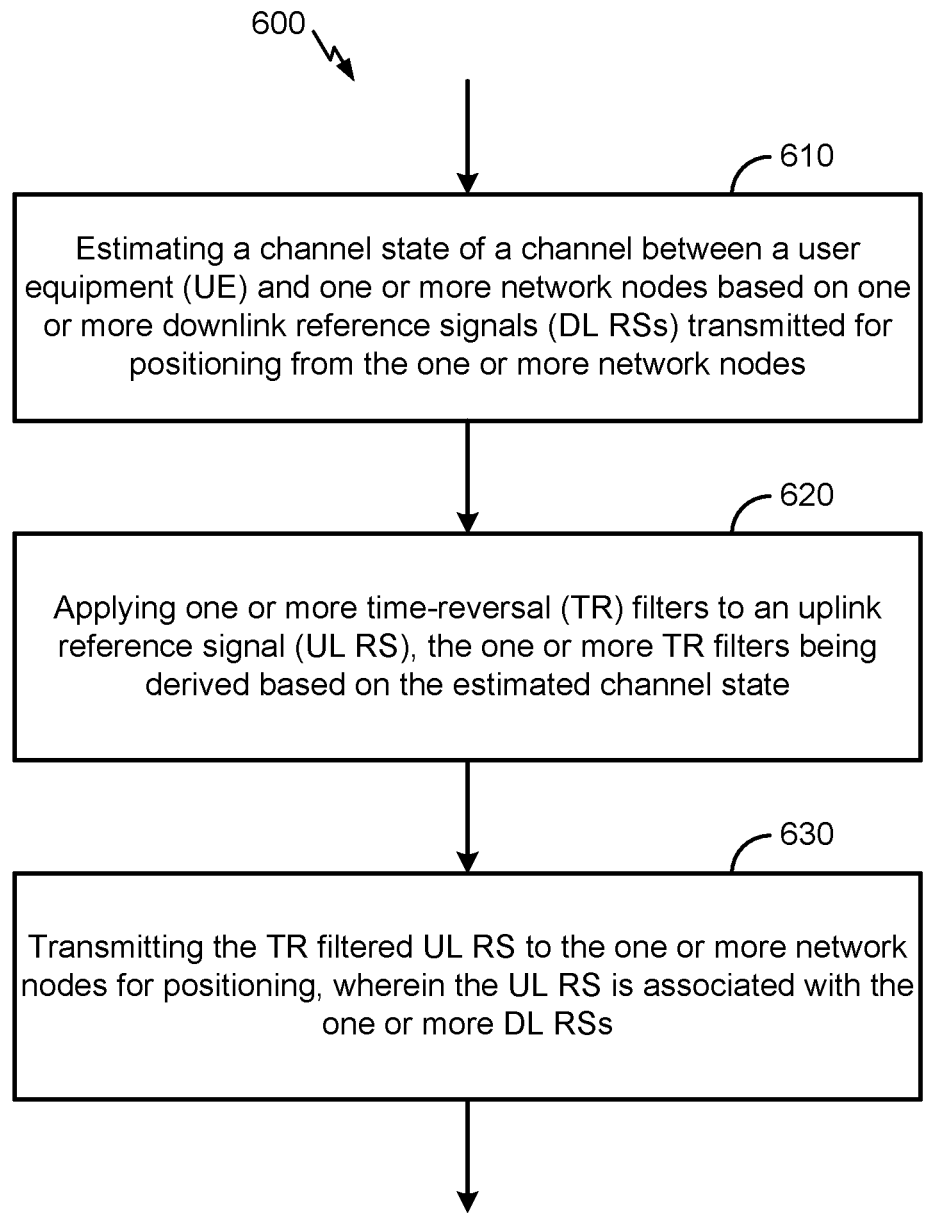
FIGS. 6-10 illustrates flowcharts of exemplary methods and processes of a user equipment (UE) according to one or more aspects.

FIG. 6 illustrates a flowchart of an exemplary method 600 of a user equipment (UE), e.g. for transmitting UL RSs for positioning. In an aspect, the memory 360 of the UE 350 in FIG. 3A may be an example of a computer-readable medium that stores computer executable instructions for one or more of the TX processor 368, the controller/processor 359, the RX processor 356, and/or the channel estimator 358 of the UE 350 to perform the method 600.

In block 610, the UE may estimate one or more channel states of one or more channels between the UE and one or more network nodes, e.g., base stations, based on one or more DL RSs for positioning transmitted on DL resources from the one or more network nodes. The DL RSs may be PRSs, CSI-RSs, DL DMRSs (e.g., DMRS on physical downlink shared channel (PDSCH)), synchronization signals (SS) (e.g., PSS, SSS), a DL PTRS, or combinations thereof. For example, the UE may estimate one or more channel impulse responses (CIRs) of the one or more channels between the UE and the one or more network nodes based on the received one or more DL RSs. That is, the UE may determine one or more h(t).

In an aspect, means to perform block 610 may include one or more of the controller/processor 359, the memory 360, the RX processor 356, the channel estimator 358, the receiver 354a, and/or the antenna 352 of the UE 350 illustrated in FIG. 3A.

In block 620, the UE may apply one or more time-reversal (TR) filters to an uplink reference signal (UL RS) for positioning. The UL RS may be an SRS, a UL DMRS (e.g., DMRS on physical uplink shared channel (PUSCH)), a UL PTRS, or combinations thereof. The one or more TR filters may be derived based on the one or more estimated channel states. For example, the UE may derive the one or more TR filters based on the one or more CIRs. That is, the UE may determine one or more h(−t)*.

The UL resources of the UL RS may be associated with the DL resources of the DL RSs. The association between the UL resources and the DL resources may comprise quasi co-location (QCL) association. The QCL association may be any combination of a reference spatial QCL association, a delay spread QCL association, an average delay QCL association, a doppler spread QCL association, and a doppler shift QCL association.

The UL resources may include any one or more of a first bandwidth part (BWP), a first component carrier (CC), a first frequency range, a first subcarrier spacing (SCS), etc. The DL resources may be similar in some or all respects or different in some or all respects to the UL resources. That is, the DL resources may include any one or more of the first BWP and/or a second BWP that is different than the first BWP, the first CC and/or a second CC that is different than the first CC, the first frequency range and/or a second frequency range that is different than the first frequency range, the first SCS and/or a second SCS that is different than the first SCS, and so on.

Note that the TR filters h(−t)*, which is in the time domain, may be equivalently represented as TR filters H(f) in the frequency domain. Application of the filter implies that the UL RS is multiplied by the frequency domain filters H(f) before being transmitted. Since a signal can be multiplied by a precoder before transmission, then in an aspect, each H(f) may be viewed as a TR precoder derived based on the estimated channel states (e.g., estimated based on the one or more DL RSs).

In an aspect, means to perform block 620 may include one or more of the controller/processor 359, the memory 360, and/or the TX processor 368 of the UE 350 illustrated in FIG. 3A.

In block 630, the UE may transmit the TR filtered UL RS on UL resources to the one or more network nodes. In other words, the UE may transmit any one or more of SRS, UL DMRS, UL PTRS, etc. after the appropriate precodes (frequency domain filters) H(f) have been applied. In an aspect, means to perform block 630 may include one or more of the controller/processor 359, the memory 360, the TX processor 368, the transmitter 354b, and/or the antenna 352 of the UE 350 illustrated in FIG. 3A.

Figure 7:
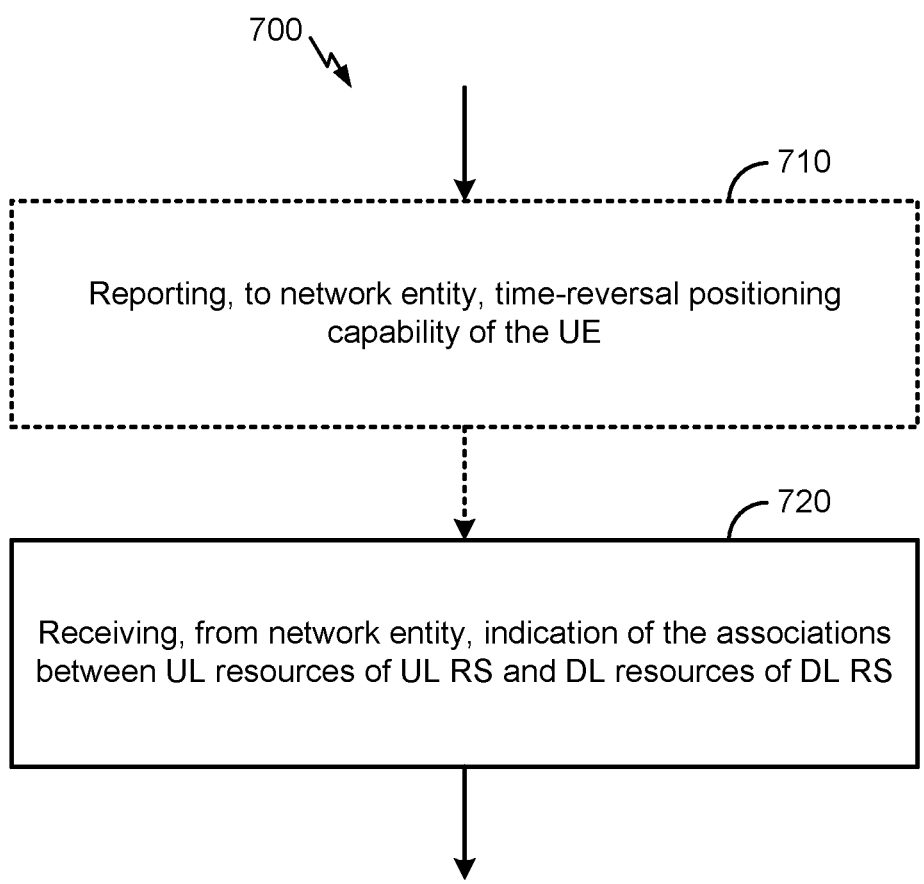

FIG. 7 illustrates a flowchart of an exemplary method 700 of a user equipment (UE). In an aspect, the memory 360 of the UE 350 in FIG. 3A may be an example of a computer-readable medium that stores computer executable instructions for one or more of the TX processor 368, the controller/processor 359, the RX processor 356, and/or the channel estimator 358 of the UE 350 to perform the method 700.

In block 710, the UE may report its TR positioning capabilities to a network entity. The network entity may be a serving network node (i.e., the base station current serving the UE), or a core network component (e.g., location server 230, LMF 270, etc.). The UE may report its capabilities on its own and/or in response to a request from the network entity. The UE may report whether it is capable of performing any one or more of the following:

subband precoding of the UL RS on a same orthogonal frequency division multiplexing (OFDM) symbol;

per-tone UL RS precoding;

UL RS precoding with non-equal power precoders.

Recall from above that the TR precoder for UL RS (e.g., SRS) may be frequency selective. Since the UE would be multiplying the signal with the frequency domain TR filter each H(f), there can be a large power spectral density (PSD) spread. This can create RF issues in UL transmission. Thus if there is a PSD difference constraint, the UE may generate an approximate precoder to satisfy the PSD difference constraint. There may be a limit on how much the UE is capable of suppressing the PSD. Thus, in an aspect, the UE may also report its PSD suppression capability in the capability report.

In an aspect, means to perform block 710 may include one or more of the controller/processor 359, the memory 360, the TX processor 368, the transmitter 354b, and/or the antenna 352 of the UE 350 illustrated in FIG. 3A.

In block 720, the UE may receive an indication of the association between the UL and DL resources from the network entity (e.g., serving base station, core network node, etc.). The indication may be included in a radio resource control (RRC) configuration of the one or more DL RSs and/or in a RRC configuration of the UL RS. Alternatively or in addition thereto, the indication may in included in a downlink control information (DCI).

In an aspect, means to perform block 720 may include one or more of the controller/processor 359, the memory 360, the RX processor 356, the receiver 354a, and/or the antenna 352 of the UE 350 illustrated in FIG. 3A.

Note that block 710 is illustrated as a dashed box. This is to indicate that the UE can have an option to report its TR positioning capabilities. Also note that there is a dashed arrow connecting blocks 710 and 720. This is to indicate that blocks 710 and 720 need not take place contemporaneously. Moreover, it is not strictly necessary that block 710 occur before block 720. For example, if block 710 is not performed, the network entity may assume a default set of TR positioning capabilities. Further note that the indication of association received in block 720 may be influenced by the TR positioning capabilities of the UE.

Figure 8:
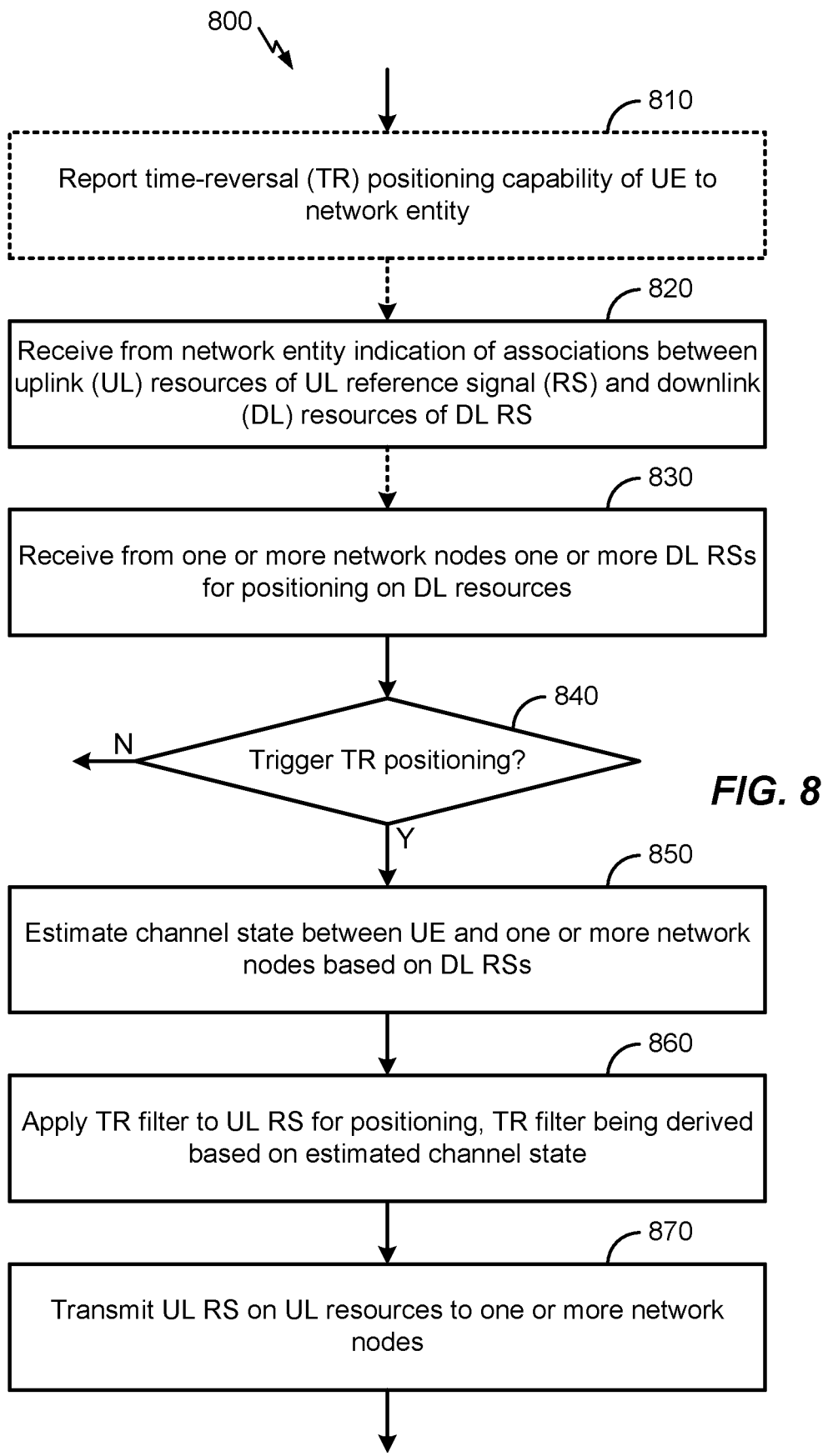

FIG. 8 illustrates an example implementation of the methods of FIGS. 6 and 7 of a UE. In an aspect, the memory 360 of the UE 350 in FIG. 3A may be an example of a computer-readable medium that stores computer executable instructions for one or more of the TX processor 368, the controller/processor 359, the RX processor 356, and/or the channel estimator 358 of the UE 350 to perform the method 800.

In block 810, the UE may report its TR positioning capabilities to the network entity. Block 810 may correspond to block 710 of FIG. 7. That is, it may be assumed that the description above with respect to block 710 is applicable to block 810. In an aspect, means to perform block 810 may include one or more of the controller/processor 359, the memory 360, the TX processor 368, the transmitter 354b, and/or the antenna 352 of the UE 350 illustrated in FIG. 3A.

In block 820, the UE may receive an indication of the association between the UL and DL resources from the network entity. Block 820 may correspond to block 720 of FIG. 7. That is, it may be assumed that the description above with respect to block 720 is applicable to block 820. In an aspect, means to perform block 820 may include one or more of the controller/processor 359, the memory 360, the RX processor 356, the receiver 354a, and/or the antenna 352 of the UE 350 illustrated in FIG. 3A.

In block 830, the UE may receive the on one or more DL RSs for positioning transmitted on DL resources from the one or more network nodes (e.g., one or more base stations). Some DL RSs may be transmitted from a same transmission reception port, and some other DL RSs may be transmitted from different TRPs. In particular, at least two DL resources of the one or more DL RSs received at the UE may be transmitted from a same TRP. Alternatively or in addition thereto, at least two other DL RSs received at the UE may be transmitted from different TRPs.

In an aspect, means to perform block 830 may include one or more of the controller/processor 359, the memory 360, the RX processor 356, the receiver 354a, and/or the antenna 352 of the UE 350 illustrated in FIG. 3A.

In block 840, the UE may determine whether or not the TR positioning. Recall that in order to trigger TR positioning process, some assumptions are made. One such assumption is that the channels between the UE and the network nodes are more or less reciprocal. In other words, the channel condition is approximately the same in the downlink and in the uplink directions (hence the QCL association). This means that if the conditions are such that channel reciprocity assumption cannot be made, then triggering the TR positioning process may not yield sufficient benefits.

In another example scenario, the conditions may be such that the additional cost of triggering the TR positioning process may not be worth the incremental improvement gained through the TR positioning process. Recall that TR positioning process improves the SNR such that the LOS (e.g., first path) signal can be detected more easily. However, if the channel is sufficiently clean (e.g., little noise and/or little interferences) such that the LOS signal can be easily detected without enhancements, then it may not be necessary to perform TR positioning process.

Figure 9:
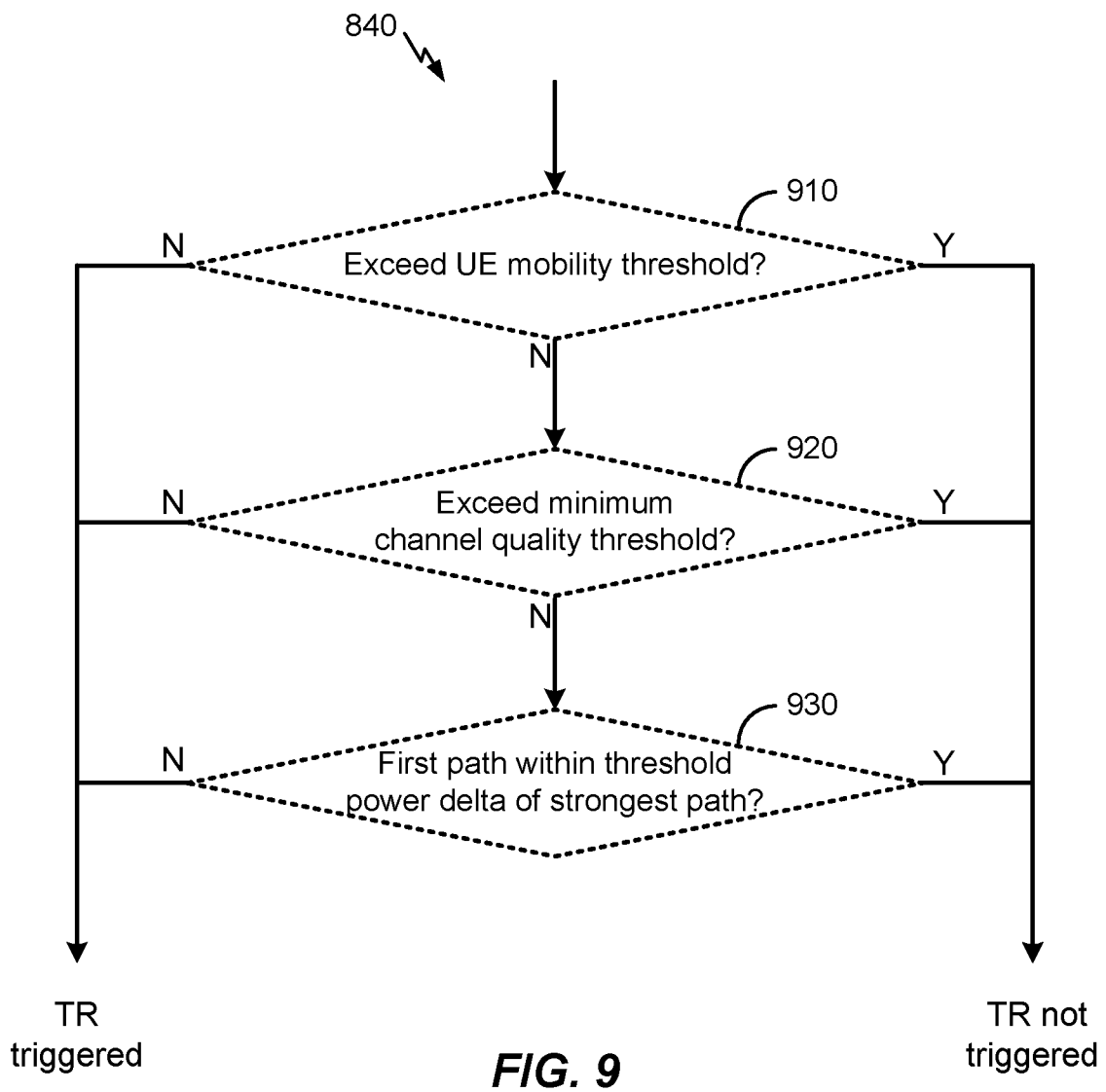

FIG. 9 illustrates an example process to perform block 840. In an aspect, the memory 360 of the UE 350 in FIG. 3A may be an example of a computer-readable medium that stores computer executable instructions for one or more of the TX processor 368, the controller/processor 359, the RX processor 356, and/or the channel estimator 358 of the UE 350 to perform the process of block 840.

In block 910, the UE may determine whether its mobility exceeds a UE mobility threshold. In other words, the UE may determine whether it is moving too fast. This simply recognizes the fact that as the UE moves, the channel between the UE and a network node can also change. Also, the rate of the channel state change can be proportional to the rate of UE's movement. Then, beyond some UE mobility threshold (e.g., user in a high speed train), it may be decided that channel reciprocity should not be assumed. Thus, in block 910, if it is determined that the UE exceeds the UE mobility (Y branch from block 910), then it may be determined that the TR positioning should NOT be triggered.

Note that the UE mobility is a proxy to represent the rate of change of the channel state. Thus, instead of or in addition to thereof, actual rate of change may be determined through measurements (not specifically illustrated). For example, measurements maybe taken at different times to determine SNR, SINR, received signal strength indicator (RSSI), etc. to calculate the change in the channel state over time to determine whether the TR positioning should be triggered.

In an aspect, means to perform block 910 may include one or more of the controller/processor 359, the memory 360, the RX processor 356, the receiver 354a, and/or the antenna 352 of the UE 350 illustrated in FIG. 3A.

In block 920, the UE may determine whether a channel between the UE and one or more network nodes exceeds a minimum channel quality threshold. In other words, the UE may determine how clean (or dirty) the channel is. For example, if the SNR, SINR, RSSI, etc. of the channel exceeds min SNR threshold, min SINR threshold, min RSSI threshold, etc., (Y branch from block 920), then it may be determined that the TR positioning need NOT be triggered.

In an aspect, means to perform block 920 may include one or more of the controller/processor 359, the memory 360, the channel estimator 358, the RX processor 356, the receiver 354a, and/or the antenna 352 of the UE 350 illustrated in FIG. 3A.

In block 930, the UE may determine whether the strength of the LOS path signal is within a threshold power delta of the strength of the signal in the strongest path. In other words, the UE may determine whether or not the signal of the strongest path overwhelms the LOS path signal. For example, if the power of the LOS path is within some k dB of the strongest path (i.e., not lower than strongest minus threshold power delta) (Y branch from block 930), then it may be determined that the TR positioning should NOT be triggered.

In an aspect, means to perform block 920 may include one or more of the controller/processor 359, the memory 360, the channel estimator 358, the RX processor 356, the receiver 354a, and/or the antenna 352 of the UE 350 illustrated in FIG. 3A.

The conditions included in FIG. 9 are not necessarily exhaustive. That is, other conditions may be specified. Also, the conditions may be applied in the conjunctive (all conditions must be satisfied), disjunctive (at least one condition must be satisfied), or a combination there of the determine whether or not to trigger the TR positioning.

Referring back to FIG. 8, if it is determined that the TR positioning is to be triggered (Y branch from block 840), the method may proceed to block 850 to perform the TR positioning process. If, on the other hand, it is determined that the TR positioning is not to be triggered, the UE may perform other processes (not illustrated). For example, the UE may transmit the UL RS for positioning without applying any TR filter.

In block 850, the UE the UE may estimate one or more channel states of one or more channels between the UE and one or more network nodes, e.g., base stations, based on one or more DL RSs for positioning transmitted on DL resources from the one or more network nodes. Block 850 may correspond to block 610 of FIG. 6, i.e., it may be assumed that the description above with respect to block 610 is applicable to block 850. In an aspect, means to perform block 850 may include one or more of the controller/processor 359, the memory 360, the RX processor 356, the channel estimator 358, the receiver 354a, and/or the antenna 352 of the UE 350 illustrated in FIG. 3A.

In block 860, the UE may apply one or more time-reversal (TR) filters to an uplink reference signal (UL RS) for positioning. Block 860 may correspond to block 620 of FIG. 6, i.e., it may be assumed that the description above with respect to block 620 is applicable to block 860. In an aspect, means to perform block 860 may include one or more of the controller/processor 359, the memory 360, the RX processor 356, the channel estimator 358, the receiver 354a, and/or the antenna 352 of the UE 350 illustrated in FIG. 3A.

Figure 10:
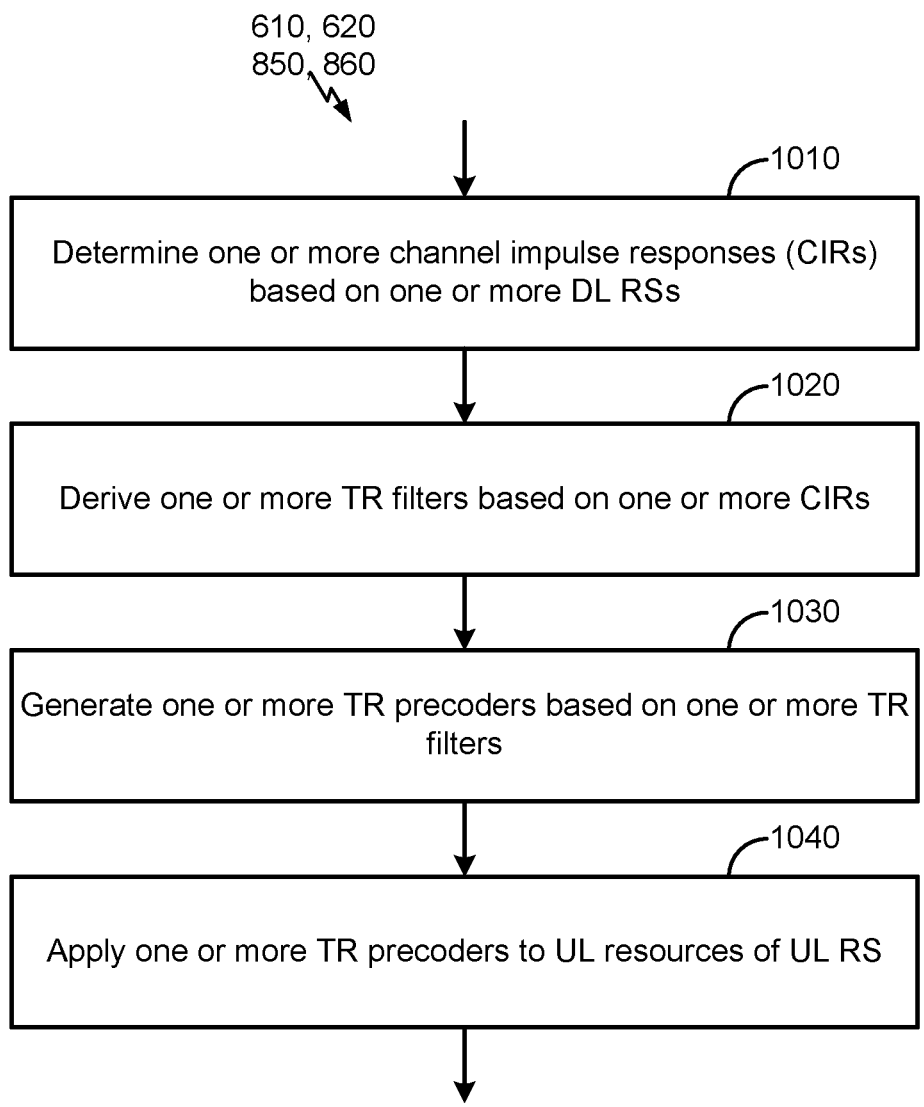

FIG. 10 illustrates an example process to perform blocks 850, 860 (610, 620). In an aspect, the memory 360 of the UE 350 in FIG. 3A may be an example of a computer-readable medium that stores computer executable instructions for one or more of the TX processor 368, the controller/processor 359, the RX processor 356, and/or the channel estimator 358 of the UE 350 to perform the process of blocks 850, 860 (610, 620).

In block 1010, the UE may determine one or more channel impulse responses (CIRs) based on the one or more DL RSs. That is, the UE may determine one or more h(t)'s. In short, the UE may determine channel states of the one or more channels. In an aspect, means to perform block 1010 may include one or more of the controller/processor 359, the memory 360, the RX processor 356, the channel estimator 358, the receiver 354a, and/or the antenna 352 of the UE 350 illustrated in FIG. 3A.

In block 1020, the UE may determine one or more TR filters based on the CIRs. That is, the UE may determine one or more h(−t)*'s based on the one or more h(t)'s. It should be noted that the number of TR filters need not be the same as the number of CIRs. For example, if first and second CIRs (e.g., $h_1(t)$ and $h_2(t)$) are substantially similar, then it may be sufficient to derive one TR filter corresponding to both CIRs. In an aspect, means to perform block 1020 may include one or more of the controller/processor 359 and/or the memory 360 of the UE 350 illustrated in FIG. 3A.

In block 1030, the UE may generate one or more TR precoders based on the one or more TR filters. That is, the UE may generate one or more H(f)'s based on the one or h(−t)*'s. In an aspect, means to perform block 1030 may include one or more of the controller/processor 359, the memory 360, and/or the TX processor 368 of the UE 350 illustrated in FIG. 3A.

In block 1040, the UE may apply the generated TR precoders to the UL resources of the UL RS for positioning. That is, the UL resources may be precoded with the precoders H(f)'s. In an aspect, means to perform block 1040 may include one or more of the controller/processor 359, the memory 360, and/or the TX processor 368 of the UE 350 illustrated in FIG. 3A.

In an aspect, the TR positioning process may be selectively implemented. In other words, the TR positioning process may be performed for some network nodes, and not for others. For example, the DL RSs from one network node may indicate that the channel between the UE and that one network node is sufficiently clean (e.g., condition of block 920 is satisfied). However, the DL RSs from another network node may indicate that the channel between the UE is very noisy (e.g., condition of block 920 is not satisfied). In such instances, the UE may trigger the TR positioning process towards networks nodes that correspond with the noisy channels, but not for those network nodes that correspond with the clean channels.

There can be a multitude of ways of generating and applying the TR filters (TR precoders), i.e., there can be multitude of ways to implement blocks 1030, 1040. A reason that one UL resource (e.g., SRS resource) may be associated with DL resources (e.g., PRS resources) of the same or different CC is because the UE may be able generate an approximate TR precoder even when a DL RS from a different CC is used for measurement since multipath may be similar. This may not necessary result in a pure time-reversal precoding. Nonetheless, it can enable some other reciprocal-based precoder that uses just the power of the multipath channel (e.g., power delay profile), and not the actual phase.

In particular, assume that the one or more DL RSs may comprise first and second DL RSs. The first DL RS may be received from a first TRP on first DL resources, and the second DL RS may be received from a second TRP on second DL resources. In an aspect, the first TRP may be a TRP of a first network node and the second TRP may be a TRP of a second network node.

In this instance, in block 1030, the UE may generate an approximate TR precoder based on a power delay profile of a channel between the UE and the first network node. Then in block 1040, the UE may apply the generated approximate TR precoder to the first DL resources and/or the second DL resources.

In another aspect, different scheduled bandwidth of a same UL RS (e.g., SRS) may be precoded specifically toward different network nodes (i.e., base stations). As an illustration, for a 40 physical resource block (PRB) UL RS, the UE may utilize 20 PRBs to perform TR transmission towards one network node, and utilize the other 20 PRBs to perform TR transmission towards another network.

In particular, again assume that the one or more DL RSs comprise first and second DL RSs as indicated above. Then in block 1030, the UE may generate a first TR precoder $H_1(f)$ corresponding to the first DL RS for the first network node, and may generate a second TR precoder $H_2(f)$ corresponding to the second DL RS for the second network node. In block 1040, the UE may apply the first TR precoder $H_1(f)$ to a first portion of a bandwidth allocated for the UL resources, and may apply the second TR precoder $H_2(f)$ to a second portion of the bandwidth allocated for the UL resources. The first and second portions maybe non-overlapping. In an aspect, the first and second portions may be first and second bandwidth parts (BWPs). The UL RS may include the configuration that identifies which portion of the transmitted bandwidth is associated with which DL resource. That is, the UL RS may include configuration indicating that the first portion is associated with the first DL RS and that the second portion is associated with the second DL RS.

In yet another aspect, an entirety of a bandwidth may be precoded towards multiple, e.g., all, configured network nodes. That is the wherein the one or more DL RSs may comprise a plurality of DL RSs received from a plurality of network nodes. In this instance, in block 1030, the UE may generate a single TR precoder H(f). In block 1040, the UE may apply the single TR precoder H(f) to an entirety of a bandwidth allocated for the UL resources of the UL RS.

Recall from above that applying the TR precoder can result in a large PSD spread, which can create RF issues. Then in yet further aspect, the UE in block 1030 may generate one or more precoders H(f) that satisfy a power spectral density (PSD) difference constraint.

Since the UE would be multiplying the signal with the frequency domain TR filter each H(f), there can be a large power spectral density (PSD) spread. This can create RF issues in UL transmission. Thus if there is a PSD difference constraint, the UE may generate an approximate precoder to satisfy the PSD difference constraint. There may be a limit on how much the UE is capable of suppressing the PSD. Thus, in an aspect, the UE may also report its PSD suppression capability in the capability report.

Referring back to FIG. 8, in block 870, the UE may transmit the UL RS on UL resources to the one or more network nodes. In an aspect, means to perform block 870 may include one or more of the controller/processor 359, the memory 360, the TX processor 368, the transmitter 354b, and/or the antenna 352 of the UE 350 illustrated in FIG. 3A.

Figure 11:
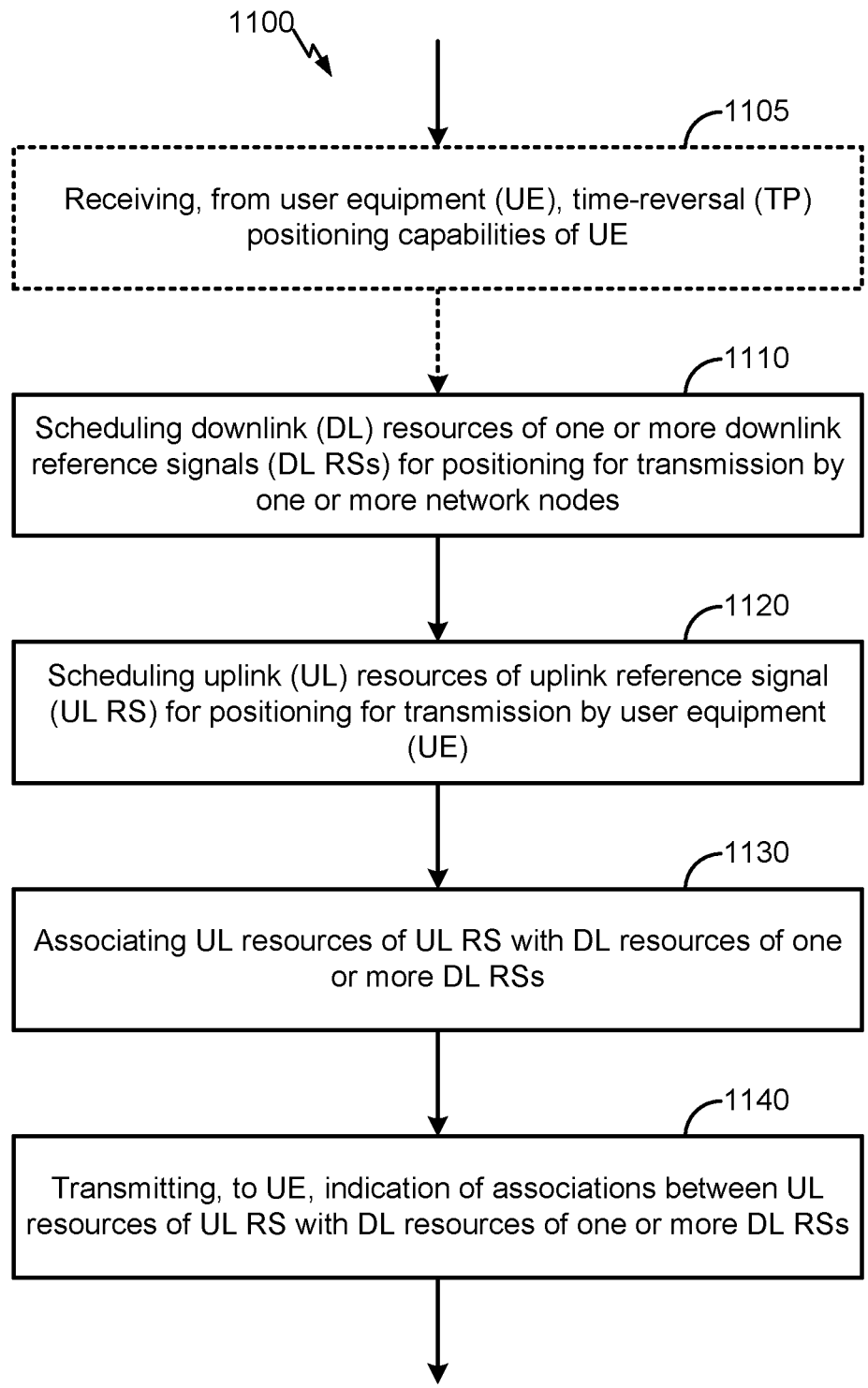
FIG. 11 illustrates a flowchart of an exemplary method of a network entity, according to one or more aspects.

FIG. 11 illustrates a flowchart of an exemplary method 1100 of a network entity (e.g., location server, LMF, serving base station, etc.). In an aspect, the memory 376 of the base station 310 in FIG. 3A may be an example of a computer-readable medium that stores computer executable instructions for one or more of the TX processor 316, the controller/processor 375, the channel estimator 374, and/or the RX processor 370 of the network node 310 of FIG. 3A to perform the method 1100. In another aspect, the volatile memory 302B, the nonvolatile memory 303B, and/or the disc drive 304B of the server 300B may be examples of computer-readable medium that stores computer executable instructions for one or more of the processor 301B and/or the network access ports 304B of the server 300B to perform the method 1100.

In block 1105, the network entity may receive from the UE its TR positioning capabilities. In an aspect, means to perform block 1105 may include one or more of the controller/processor 375, the memory 376, the RX processor 370, the receiver 318b, and/or the antenna 320 of the network node 310 illustrated in FIG. 3A. In another aspect, means to perform block 1105 may include processor 301B, the memory 302B, the memory 303B, and/or the network access port 304B of the server 300B in FIG. 3B.

In block 1110, the network entity may schedule the DL resources for transmission by one or more network nodes of one or more DL RSs for positioning. In some circumstances, at least two DL resources of the one or more DL RSs may be scheduled for transmission from a same TRP. Alternatively or in addition thereto, at least two DL resources of the one or more DL RSs may be scheduled for transmission from different TRPs. In an aspect, means to perform block 1110 may include one or more of the controller/processor 375 and/or the memory 376 of the network node 310 illustrated in FIG. 3A. In another aspect, means to perform block 1110 may include processor 301B, the memory 302B, and/or the memory 303B of the server 300B in FIG. 3B.

In block 1120, the network entity may schedule the UL resources for transmission by a UE a UL RS for positioning. In an aspect, means to perform block 1120 may include one or more of the controller/processor 375 and/or the memory 376 of the network node 310 illustrated in FIG. 3A. In another aspect, means to perform block 1120 may include processor 301B, the memory 302B, and/or the memory 303B of the server 300B in FIG. 3B.

In block 1130, the network entity may associate the UL resources of the UL RS with the DL resources of the one or more DL RSs. In an aspect, means to perform block 1120 may include one or more of the controller/processor 375 and/or the memory 376 of the network node 310 illustrated in FIG. 3A. In another aspect, means to perform block 1120 may include processor 301B, the memory 302B, and/or the memory 303B of the server 300B in FIG. 3B.

In block 1140, the network entity may transmit to the UE an indication of the association between the UL resource of the UL RS with the DL resources of the one or more DL RSs. In an aspect, means to perform block 1140 may include one or more of the controller/processor 375, the memory 376, the TX processor 316, the transmitter 318a, and/or the antenna 320 of the network node 310 illustrated in FIG. 3A. In another aspect, means to perform block 1105 may include processor 301B, the memory 302B, the memory 303B, and/or the network access port 304B of the server 300B in FIG. 3B.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be communicatively coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A user equipment (UE), comprising:
   a transceiver;
   a memory; and
   a processor communicatively coupled to the transceiver and the memory,
   wherein the processor, the transceiver, and/or the memory are configured to:
   estimate one or more channel states of one or more channels between the UE and one or more network nodes based on one or more downlink reference signals (DL RSs) for positioning transmitted on DL resources from the one or more network nodes;
   apply one or more time-reversal (TR) filters to an uplink reference signal (UL RS) for positioning, the one or more TR filters being derived based on the one or more estimated channel states; and
   transmit, to the one or more network nodes, the TR filtered UL RS on UL resources,
   wherein the UL resources of the UL RS are associated with the DL resources of the one or more DL RSs.

2. The UE of claim 1,
   wherein the UL RS is a sounding reference signal (SRS), a UL demodulation reference signal (UL DMRS), or a UL phase tracking reference signal (UL PTRS), and
   wherein the one or more DL RSs include a positioning reference signal (PRS), a channel state information reference signal (CSI-RS), a DL DMRS, a primary synchronization signal (PSS), secondary synchronization signal (SSS), or a DL PTRS.

3. The UE of claim 1, wherein an association between the UL resources and the DL resources comprises a quasi co-location (QCL) association.

4. The UE of claim 3, wherein the QCL association between the UL resources and the DL resources comprises a reference spatial QCL association, a delay spread QCL association, an average delay QCL association, a doppler spread QCL association, a doppler shift QCL association, or any combination thereof.

5. The UE of claim 3,
wherein at least two DL resources of the one or more DL RSs are transmitted from a same transmission reception port (TRP), and/or
wherein at least two DL resources of the one or more DL RSs are transmitted from different TRPs.

6. The UE of claim 3,
wherein the UL resources include a first bandwidth part (BWP), and the DL resources include the first BWP and/or a second BWP that is different than the first BWP,
wherein the UL resources include a first component carrier (CC), and the DL resources include the first CC and/or a second CC that is different than the first CC,
wherein the UL resources include a first frequency range, and the DL resources include the first frequency range and/or a second frequency range that is different than the first frequency range,
wherein the UL resources include a first subcarrier spacing (SCS), and the DL resources include the first SCS and/or a second SCS that is different than the first SCS, or
any combination thereof.

7. The UE of claim 1, wherein the processor, the transceiver, and/or the memory are further configured to report, to a network entity, TR positioning capabilities of the UE.

8. The UE of claim 7, wherein the TR positioning capabilities of the UE comprises:
subband precoding of the UL RS on a same orthogonal frequency division multiplexing (OFDM) symbol,
per-tone UL RS precoding,
UL RS precoding with non-equal power precoders,
power spectral density (PSD) suppression capability, or
any combination thereof.

9. The UE of claim 1, wherein the processor, the transceiver, and/or the memory are further configured to receive, from a network entity, an indication of the association between the UL and DL resources.

10. The UE of claim 9,
wherein the indication is included in a radio resource control (RRC) configuration of the one or more DL RSs,
wherein the indication is included in a downlink control information (DCI),
wherein the indication is included in an RRC configuration of the UL RS, or
any combination thereof.

11. The UE of claim 1,
wherein the processor, the transceiver, and/or the memory are further configured to determine whether or to trigger TR positioning prior to estimating the one or more channel states, and
wherein the one or more channels are estimated only when it is determined that the TR positioning is to be triggered.

12. The UE of claim 11, wherein the TR positioning is not triggered when:
a mobility of the UE does not exceed a UE mobility threshold,
a channel quality of a channel exceeds a channel quality threshold,
a power of line-of-sight (LOS) path of a channel is within a threshold power delta of a strongest path of the channel, or
any combination thereof.

13. The UE of claim 1, wherein the processor, the transceiver, and/or the memory are configured to estimate the one or more channel states and apply the one or more TR filters to the UL RS by:
determining one or more channel impulse responses (CIRs) $h(t)$ based on the one or more DL RSs;
deriving one or more TR filters $h(-t)^*$ based on the one or more CIRs $h(t)$;
generating one or more TR precoders $H(f)$ based on the one or more TR filters $h(-t)^*$; and
applying the one or more TR precoders $H(f)$ to the UL resources of the UL RS.

14. The UE of claim 13,
wherein the one or more DL RSs comprise a first DL RS received from a first network node on first DL resources and a second DL RS received from a second network node on second DL resources, and
wherein the processor, the transceiver, and/or the memory are configured to:
generate an approximate TR precoder based on a power delay profile of a channel between the UE and the first network node, and
apply the approximate TR precoder to the UL resources associated with the first DL resources and/or with the second DL resources.

15. The UE of claim 14, wherein the first and second DL resources are DL resources of different component carriers (CCs).

16. The UE of claim 13,
wherein the one or more DL RSs comprise a first DL RS received from a first network node on first DL resources and a second DL RS received from a second network node on second DL resources,
wherein the processor, the transceiver, and/or the memory are configured to generate the one or more TR precoders $H(f)$ by generating a first TR precoder $H_1(f)$ corresponding to the first DL RS for the first network node and generating a second TR precoder $H_2(f)$ corresponding to the second DL RS for the second network node, and
wherein the processor, the transceiver, and/or the memory are configured to apply the one or more TR precoders $H(f)$ by applying the first TR precoder $H_1(f)$ to a first portion of a bandwidth allocated for the UL resources and applying the second TR precoder $H_2(f)$ to a second portion of the bandwidth allocated for the UL resources, the first and second portions being non-overlapping portions.

17. The UE of claim 16, wherein the first and second portions of the bandwidth are first and second bandwidth parts (BWPs).

18. The UE of claim 16, wherein the UL RS includes configuration indicating that the first portion is associated with the first DL RS and that the second portion is associated with the second DL RS.

19. The UE of claim 13,
wherein the one or more DL RSs comprise a plurality of DL RSs received from a plurality of network nodes,
wherein the processor, the transceiver, and/or the memory are configured to generate a single TR precoder H(f), and apply the single TR precoder H(f) to an entirety of a bandwidth allocated for the UL resources.

20. The UE of claim 13, wherein the processor, the transceiver, and/or the memory are configured to generate the one or more TR precoders H(f) that satisfy a power spectral density (PSD) difference constraint.

21. A network entity, comprising:
a transceiver;
a memory; and
a processor communicatively coupled to the transceiver and the memory,
wherein the processor, the transceiver, and/or the memory are configured to:
schedule downlink (DL) resources for transmission by one or more network nodes of one or more downlink reference signals (DL RS) for positioning;
schedule uplink (UL) resources for transmission by a user equipment (UE) of an uplink reference signal (UL RS) for positioning;
associate the UL resources of the UL RS with the DL resources of the one or more DL RSs; and
transmit, to the UE, an indication of the association between the UL resources of the UL RS with the DL resources of the one or more DL RSs.

22. The network entity of claim 21,
wherein the UL RS is a sounding reference signal (SRS), a UL demodulation reference signal (UL DMRS), or a UL phase tracking reference signal (UL PTRS), and
wherein the DL RS is a positioning reference signal (PRS), a channel state information reference signal (CSI-RS), a DL DMRS, a primary synchronization signal (PSS), secondary synchronization signal (SSS), or a DL PTRS.

23. The network entity of claim 21, wherein the associations between the UL resources and the DL resources comprises a quasi co-location (QCL) association.

24. The network entity of claim 21,
wherein the UL resources include a first bandwidth part (BWP), and the DL resources include the first BWP and/or a second BWP that is different than the first BWP,
wherein the UL resources include a first component carrier (CC), and the DL resources include the first CC and/or a second CC that is different than the first CC,
wherein the UL resources include a first frequency range, and the DL resources include the first frequency range and/or a second frequency range that is different than the first frequency range,
wherein the UL resources include a first subcarrier spacing (SCS), and the DL resources include the first SCS and/or a second SCS that is different than the first SCS, or
any combination thereof.

25. The network entity of claim 21, wherein the processor, the transceiver, and/or the memory are further configured to receive, from the UE, TR positioning capabilities of the UE.

26. The network entity of claim 25, wherein the TR positioning capabilities of the UE comprises:
subband precoding of the UL RS on a same orthogonal frequency division multiplexing (OFDM) symbol,
per-tone UL RS precoding,
UL RS precoding with non-equal power precoders,
power spectral density (PSD) suppression capability, or
any combination thereof.

27. The network entity of claim 25, wherein the processor, the transceiver, and/or the memory are configured to associate the UL resources of the UL RS with the DL resources of the one or more DL RSs based on the TR positioning capabilities of the UE.

28. The network entity of claim 21,
wherein the indication is included in a radio resource control (RRC) configuration of the one or more DL RSs,
wherein the indication is in a downlink control information (DCI),
wherein the indication is included in an RRC configuration of the UL RS, or
any combination thereof.

29. A method of a user equipment (UE), the method comprising:
estimating one or more channel states of one or more channels between the UE and one or more network nodes based on one or more downlink reference signals (DL RSs) for positioning transmitted on DL resources from the one or more network nodes;
applying one or more time-reversal (TR) filters to an uplink reference signal (UL RS) for positioning, the one or more TR filters being derived based on the one or more estimated channel states; and
transmitting, to the one or more network nodes, the TR filtered UL RS on UL resources,
wherein the UL resources of the UL RS are associated with the DL resources of the one or more DL RSs.

30. A method of a network entity, the method comprising:
scheduling downlink (DL) resources for transmission by one or more network nodes of one or more downlink reference signals (DL RS) for positioning;
scheduling uplink (UL) resources for transmission by a user equipment (UE) of an uplink reference signal (UL RS) for positioning;
associating the UL resources of the UL RS with the DL resources of the one or more DL RSs; and
transmitting, to the UE, an indication of the association between the UL resources of the UL RS with the DL resources of the one or more DL RSs.

* * * * *